March 9, 1926.  1,576,438

F. H. JACKSON

METHOD OF TESTING THE CONSISTENCY OF CONCRETE

Filed June 24, 1925

Frank H Jackson.
Inventor

Attorney

Patented Mar. 9, 1926.

1,576,438

UNITED STATES PATENT OFFICE.

FRANK H. JACKSON, OF WASHINGTON, DISTRICT OF COLUMBIA, DEDICATED, BY MESNE ASSIGNMENT, TO THE CITIZENS OF THE UNITED STATES.

METHOD OF TESTING THE CONSISTENCY OF CONCRETE.

Application filed June 24, 1925. Serial No. 39,373.

(GRANTED UNDER THE ACT OF MARCH 3, 1883; 22 STAT. L. 625.)

*To all whom it may concern:*

Be it known that I, FRANK H. JACKSON, a citizen of the United States, and an employee of the United States Department of Agriculture, residing in Washington, in the District of Columbia, have invented certain new and useful Improvements in Methods of Testing the Consistency of Concrete, of which the following is a specification.

This application is made under the act of March 3, 1883, chapter 143 (22 Stat. 625) and the invention herein described and claimed may be used by the Government of the United States or any of its officers or employees in the prosecution of work for the Government, or any person in the United States, without payment to me of any royalty thereon.

This invention relates to a new method of and means for testing freshly-mixed cement concrete by determining the weight of material which will be retained upon a plate of given area when the concrete is deposited thereon in a standard manner. It is well known that the consistency of concrete depends upon the amount of water contained therein, and that the percentage of water in turn influences to a large extent the strength and other physical properties of the finished product. It is highly important therefore that some means be developed for determining with a reasonable degree of accuracy the consistency of the freshly-mixed concrete. To accomplish this result, I utilize an apparatus which I have illustrated in the accompanying drawing, and which I have fund by numerous tests to be an entirely satisfactory means for determining this quality in the concrete.

Figure 1:
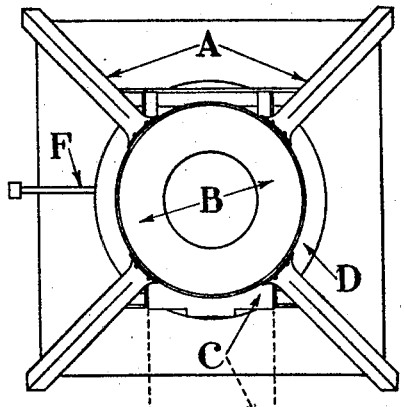
Figure 2:
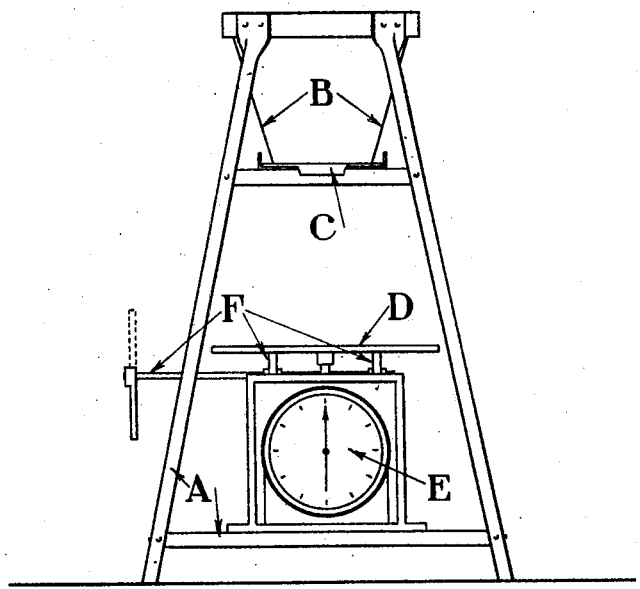

Referring to the drawings, Fig. 1 is a plan view and Fig. 2 an elevation of the complete apparatus, in which $a$ represents an angle iron support from the top of which is suspended a truncated cone $b$, provided with a sliding gate $c$. The weighing device consists of a circular brass plate $d$ of suitable diameter, mounted upon and forming a part of the enclosed spring balance $e$. A lever with two cams $f$ is provided for supporting the brass plate $d$ until the concrete is ready to be weighed.

The method of test is substantially as follows: The inverted truncated cone $b$, with the gate $c$ closed, is filled with the freshly-mixed concrete. The cams $f$ are set so as to support the plate $d$, after which the sliding gate $c$ is opened and the concrete allowed to fall upon the plate $d$. After the mass retained upon the plate has become quiescent, the lever operating the cams $f$ is rotated and the weight of the concrete determined directly by reading the scale $e$.

The apparatus illustrated in the accompanying drawing is shown simply to indicate a suitable device which may be used in the application of this method for determining consistency of concrete. Any suitable weighing device of sufficient capacity as well as any suitable means for depositing the concrete upon the plate in a standard manner may be employed.

I claim:

A method of determining the consistency of cement concrete consisting in placing upon a circular retaining plate of given dimensions as much concrete as the plate will carry, in weighing the concrete retained on said plate and in determining the consistency of said concrete which is directly proportionate to the weight thereof.

FRANK H. JACKSON.